UNITED STATES PATENT OFFICE.

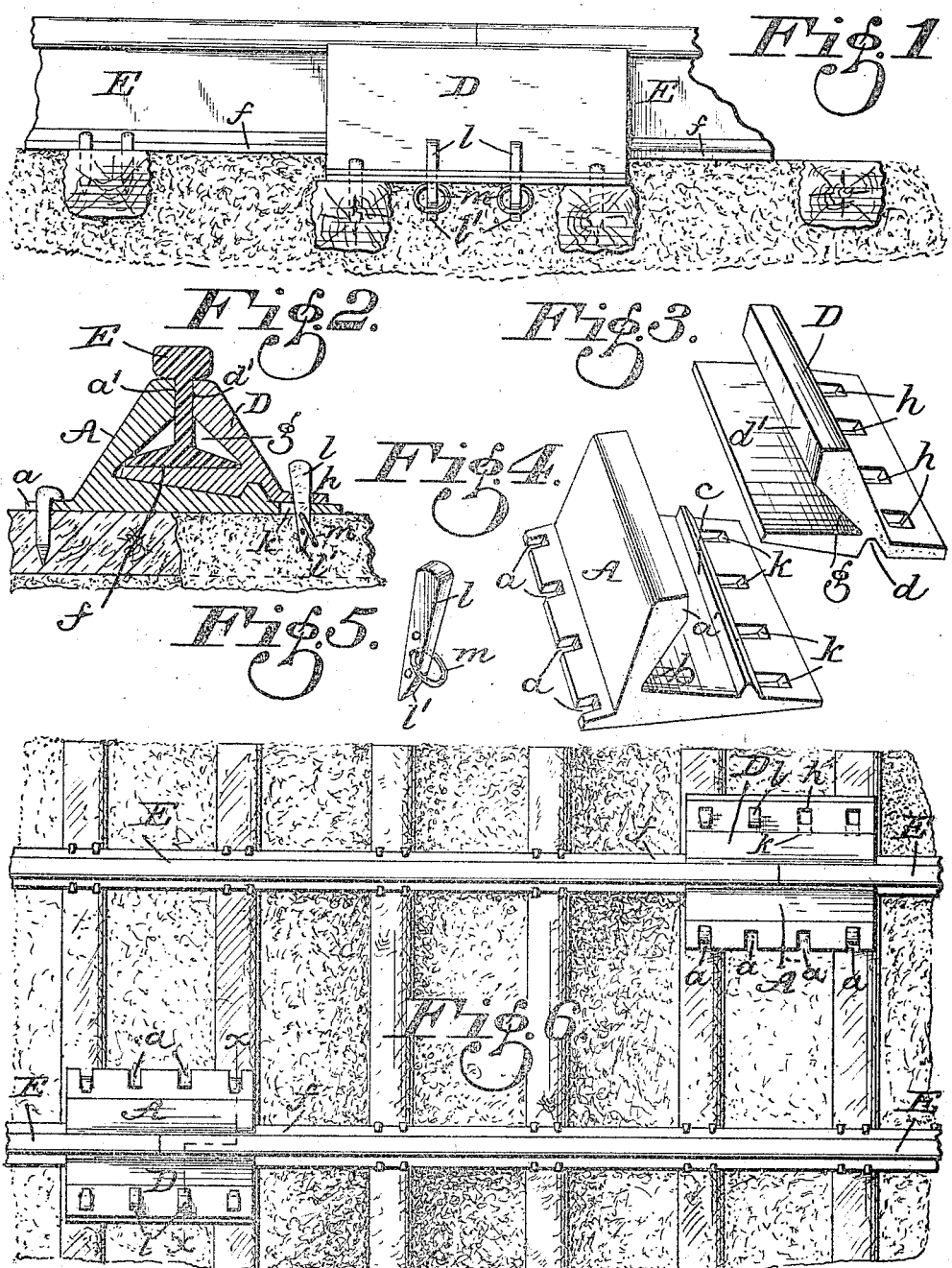
A. M. BENJAMIN.
BOLTLESS LOCKING BODY FOR CONNECTING TRACK RAIL SECTIONS.
APPLICATION FILED MAY 1, 1908.
960,790.  Patented June 7, 1910.

ABNER M. BENJAMIN, OF DAYTON, OHIO.

BOLTLESS LOCKING-BODY FOR CONNECTING TRACK-RAIL SECTIONS.

960,790.

Specification of Letters Patent.

Patented June 7, 1910.

Application filed May 1, 1908. Serial No. 430,311.

*To all whom it may concern:*

Be it known that I, ABNER M. BENJAMIN, a citizen of the United States, residing at Dayton, in the county of Montgomery, and State of Ohio, have invented certain new and useful Improvements in a Boltless Locking-Body for Connecting Track-Rail Sections, of which the following is a specification.

My invention belongs generally to that class of devices employed as a connecting or joining means, for retaining together the abutting ends of sections of track rails for a railroad or traction line; but specifically stated, said invention relates to a "boltless locking body for connecting track-rail sections" and is adapted for all classes of track rails.

Some of the chief objects and advantages sought and attained by my "boltless locking body for connecting track-rail sections" consist in producing a device or attachment as above referred to by which the abutting ends of the rails will be so securely and rigidly fastened or joined at the juncture or joint as to prevent the lateral spreading or outward or inward displacement of said rails, thus preventing the constant derailing of cars, thereby avoiding the great loss of life connected therewith; also, in producing a device which will entirely dispense with the expensive fish-plates, bolts, and nut locks, thus causing a great saving in cost of manufacture. The device will seldom if ever need repairing; is composed of few parts; very simple in construction and necessarily quite inexpensive; and is intended in practice preferably to be constructed out of rolled metal, thus saving the expense of drop forging.

My invention consists essentially, referring briefly and in general terms to the construction of the device, of the two interlocking halves or portions which form the body thereof; the locking wedges or keys, each provided with an annular staple or open and shut retaining ring; and the minor details, and the very peculiar and novel construction, arrangement, and combination of these several mechanical parts or elements as will be hereinafter more fully and elaborately described in detail, and set forth in the subjoined claims, in accordance with the statutes in such cases made and provided therefor.

Referring to the accompanying drawing illustrating my invention and constituting a formal part of this specification, and wherein the same letters of reference indicate or point out the same parts wherever occurring throughout the several views: Figure 1 is a side elevation of a portion of a track, showing two broken away sections of rails, with my locking connection attached thereto in securing the joint; and Fig. 2 is a transverse sectional view partly broken away of same taken on dotted lines $x$—$x$ of Fig. 6; but on a slightly enlarged scale therefrom. Fig. 3 is a perspective view of the small or upper half or body portion; and Fig. 4 is a perspective view of the large or lower half or body portion. Fig. 5 is a perspective view of one of the locking wedges or keys and its annular staple or open and shut retaining ring; and Fig. 6 is a general view of a portion of track with my device in operative position, illustrating the practical operation of the invention.

In describing my said invention specifically, and referring in detail to the different mechanical parts or elements of construction of the device, as shown throughout the several views of the drawing, and indicated or pointed out by means of the reference letters as aforesaid: A indicates the large or lower half, which is shaped approximately as fully shown in Figs. 2 and 4, and is formed on the inner side at the base, with recesses $a$ for the reception of spikes; said recesses being of a sufficient number to always register with two of the ties, no matter what distance apart said ties may be laid. Two of said spikes engaging the two ties or sleepers transversely located one at each end thereof. Said half being formed with an angular recess $b$ and a rib $c$ adapted to engage a similarly shaped groove $d$ provided to receive it in the small or upper half D; whereby the base of said small half is adapted to rest securely within the angular recess of said large half, and forms a floor for the base or supporting-flange $f$ of the rail sections or rails E to rest on; when located within the angular recess $g$ formed in said small or upper half; while the inner top faces $a'$ and $d'$ of the respective halves A and D will tightly grip the web of said rails, thus holding the ends of said rail sections together and in the same longitudinal alinement at their juncture or joint. Said halves when thus assembled forming the locking body or connection; the small or upper half D being provided with eyes or openings $h$, which register with similar shaped but somewhat larger eyes or openings $k$ located in the large or lower half A—see Figs. 2 and 6—so that the tighter the wedges or keys $l$ are driven in the two central openings $h$ and $k$, the closer and tighter half D will be forced within half A, and the rail sections E will be more firmly and securely held and locked at the joint. Said wedges—as more fully and particularly shown in Fig. 5—are each for convenience provided with a beveled or pointed end or tip $l'$, also small openings or eyes for the reception of an annular staple or open and shut ring $m$, by which said wedges or keys are retained in position.

As more specifically shown in Fig. 1, the eyes or openings $h$ and $k$, which come at the ends of said halves, are adapted to receive ordinary spikes which are driven in the ties in the usual manner,—said eyes the same as those centrally located which receive the locking wedges or keys,—of course being of the same contour or shape as the spike and wedges which they receive.

Having now clearly described my improved device taken in connection with the illustrations; I claim as my invention:

1. The combination in a locking body for retaining in alinement track-rail sections, of a portion of said body formed with a rib; another portion of said body having a groove adapted to engage said rib; said portions when assembled adapted to receive the abutting ends of the sections of track-rails; and keys for retaining said portions together; substantialy as described.

2. A means for locking in alinement track-rail sections, consisting of a body having in combination a portion formed with a recess and provided with a rib; an oppositely located portion formed with a recess and adapted to rest partially within said first portion and having a groove which rests over the rib of said first portion; the recesses of said portions when assembled adapted to firmly hold said track-rail sections; and keys for retaining said portions in close relation one with the other; substantially as described.

3. The combination in the herein referred to means for securely connecting the joints of track rail sections, a large and lower half having an angular recess and formed with a rib and provided on one side with large eyes or openings; a small and upper half adapted to rest within said first half and formed with an angular opening adapted to receive and hold the supporting flange or base of the rails, and provided with a groove to rest on said rib of the first half, and formed with small eyes; and wedges to pass through and rest in two of said large and small eyes of said halves each provided with an annular staple or retaining ring; all substantially as described.

In testimony whereof I affix my signature in presence of two witnesses.

ABNER M. BENJAMIN.

Witnesses:
C. H. YAGER,
A. C. McDONALD.